US010915490B2

(12) United States Patent
Klacar et al.

(10) Patent No.: US 10,915,490 B2
(45) Date of Patent: Feb. 9, 2021

(54) AUDIO STREAMS OVER PERIPHERAL COMPONENT INTERCONNECT (PCI) EXPRESS (PCIE) LINKS

(71) Applicant: QUALCOMM Incorporated, San Diego, CA (US)

(72) Inventors: Neven Klacar, Encinitas, CA (US); Murali Krishna, San Diego, CA (US); Arunn Coimbatore Krishnamurthy, San Diego, CA (US); Jitendra Prasad, San Diego, CA (US); Jean-Marie Quoc Danh Tran, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/269,636

(22) Filed: Feb. 7, 2019

(65) Prior Publication Data
US 2019/0251056 A1    Aug. 15, 2019

Related U.S. Application Data

(60) Provisional application No. 62/710,453, filed on Feb. 16, 2018, provisional application No. 62/631,272, filed on Feb. 15, 2018.

(51) Int. Cl.
*G06F 3/16* (2006.01)
*G06F 13/42* (2006.01)
*H04J 3/06* (2006.01)

(52) U.S. Cl.
CPC ...... *G06F 13/4291* (2013.01); *G06F 13/4295* (2013.01); *H04J 3/0626* (2013.01); *H04J 3/0685* (2013.01); *G06F 2213/0026* (2013.01)

(58) Field of Classification Search
None
See application file for complete search history.

(56) References Cited

U.S. PATENT DOCUMENTS

| 7,770,050 | B2 * | 8/2010 | Sargaison | G06F 1/12 |
| | | | | 713/600 |
| 8,599,310 | B2 * | 12/2013 | Carter | H03L 7/16 |
| | | | | 348/515 |
| 10,331,612 | B1 | 6/2019 | Petkov et al. | |
| 2005/0288805 | A1 | 12/2005 | Moore et al. | |
| 2006/0209684 | A1 * | 9/2006 | Bei | H04L 1/1867 |
| | | | | 370/229 |

(Continued)

OTHER PUBLICATIONS

International Search Report and Written Opinion for International Patent Application No. PCT/US2019/017173, dated May 20, 2019, 13 pages.

(Continued)

*Primary Examiner* — Cheng Yuan Tseng
(74) *Attorney, Agent, or Firm* — Withrow & Terranova, PLLC

(57) ABSTRACT

Systems and methods for providing audio streams over peripheral component interconnect (PCI) express (PCIE) links are disclosed. In particular, exemplary aspects of the present disclosure are used to calculate an uplink timing requirement and adjust a margin time before a modem encodes audio data so that the encoding is done before data is transmitted to an external network. Further aspects of the present disclosure allow a first integrated circuit (IC) to synchronize its clock with that of the modem.

24 Claims, 8 Drawing Sheets

(56) References Cited

U.S. PATENT DOCUMENTS

2014/0344490 A1 11/2014 Tsfaty et al.
2016/0142988 A1 5/2016 Powell et al.

OTHER PUBLICATIONS

International Preliminary Report on Patentability for International Patent Application No. PCT/US2019/017173, dated Aug. 27, 2020, 8 pages.

* cited by examiner

AUDIO STREAMS OVER PERIPHERAL COMPONENT INTERCONNECT (PCI) EXPRESS (PCIE) LINKS

PRIORITY CLAIMS

The present application claims priority to U.S. Provisional Patent Application Ser. No. 62/631,272 filed on Feb. 15, 2018 and entitled "AUDIO STREAMS OVER PERIPHERAL COMPONENT INTERCONNECT (PCI) EXPRESS (PCIE) BUSES," the contents of which is incorporated herein by reference in its entirety.

The present application also claims priority to U.S. Provisional Patent Application Ser. No. 62/710,453 filed on Feb. 16, 2018 and entitled "AUDIO STREAMS OVER PERIPHERAL COMPONENT INTERCONNECT (PCI) EXPRESS (PCIE) BUSES," the contents of which is incorporated herein by reference in its entirety.

BACKGROUND

I. Field of the Disclosure

The technology of the disclosure relates generally to audio streams in a mobile computing device and, particularly, to audio streams being passed to an internal modem.

II. Background

Mobile telephones have evolved from the early telephonic devices to multi-function multimedia platforms capable of duplicating many functions that historically were the province of desktop computers. However, most such mobile terminals still maintain some form of telephonic functions. Voice and other audio for such telephonic functions is captured by one or more microphones and passed to audio processing circuitry over a first bus, such as an audio bus such as a SLIMBUS, SOUNDWIRE bus, or an Inter-Integrated circuit Sound (I2S) bus. After initial processing, the audio signal is passed to a modem for transmission to an external network. In the other direction, the external network may provide incoming signals to the modem, which passes the incoming signals to the audio processing circuitry. The audio processing circuitry passes the audio signals over the audio bus to speakers for playback to the user. In many instances, the audio processing circuitry is incorporated into a larger integrated circuit (IC) frequently known as an application processor.

Various internal buses may be used to exchange data between the application processor and the modem, such as Inter-integrated circuit (I2C), serial peripheral interface (SPI), or other serial interfaces. One popular bus is based on the peripheral component interconnect (PCI) express (PCIE) standard published by the PCI Special Interest Group (PCI-SIG). PCIE is a high-speed point-to-point serial bus. As the bus is point-to-point, it may also be referred to as a PCIE link. PCIE version 4 was officially announced on Jun. 8, 2017 and version 5 has been preliminary proposed at least as early as June 2017 with expected release in 2019.

While PCIE is a fast bus, it is not optimized for audio signals. In a first approach, using the high-speed link of the PCIE bus to stream low bandwidth audio data continuously without interruption consumes relatively high levels of power, which is generally undesirable in a battery-powered device. Alternatively, the audio data may be sent in bursts. The bursts need to be delivered in a timely fashion as any delay in audio transmission would cause large gaps or missing audio samples in what should be a continuous audio stream for the end user. As such, there is room for improving how PCIE handles audio streams.

SUMMARY OF THE DISCLOSURE

Aspects disclosed in the detailed description include systems and methods for providing audio streams over peripheral component interconnect (PCI) express (PCIE) links. In particular, exemplary aspects of the present disclosure are used to calculate an uplink timing requirement and adjust a margin time before a modem encodes audio data so that the encoding is done before data is transmitted to an external network. Further aspects of the present disclosure allow a first integrated circuit (IC) to synchronize its clock with that of the modem. By optimizing the PCIE link in this fashion, the audio stream is handled in such a manner so as to minimize discontinuities in the audio data and thus improve audio quality for the user. While telephonic functions are contemplated, other multimedia functions may also benefit from the present disclosure.

In one aspect, a method for synchronizing clocks across a high-speed point-to-point serial bus interface is disclosed. The method includes determining a time offset between a host clock and a device clock. The method also includes adjusting the host clock by the time offset when sending audio data to a device.

In another aspect, a method of maintaining synchronization between a modem and an application processor over a PCIE link is disclosed. The method includes receiving a posted command at a device. The method also includes storing a request identifier and a time source in a first register at the device. The method also includes, responsive to receiving the posted command, storing a local time in a second register at the device. The method also includes providing the local time to a host.

In another aspect, an apparatus including an application processor is disclosed. The apparatus includes a high-speed point-to-point serial bus interface. The apparatus also includes a host clock. The apparatus also includes a modem host interface operatively coupled to the high-speed point-to-point serial bus interface and the host clock. The modem host interface is configured to determine a time offset between the host clock and a clock at a device. The modem host interface is also configured to adjust the host clock to maintain synchronization between the host clock and the clock at the device.

In another aspect, an apparatus including a device is disclosed. The apparatus includes a high-speed point-to-point serial bus interface. The apparatus also includes a first register. The apparatus also includes a second register. The apparatus also includes a modem host interface operatively coupled to the high-speed point-to-point serial bus interface. The modem host interface is configured to receive a posted command from a host. The modem host interface is also configured to store a request identifier and a time source in the first register. The modem host interface is also configured, response to receiving the posted command, to store a local time in the second register. The modem host interface is also configured to provide the local time to the host.

DETAILED DESCRIPTION

Figure 1:
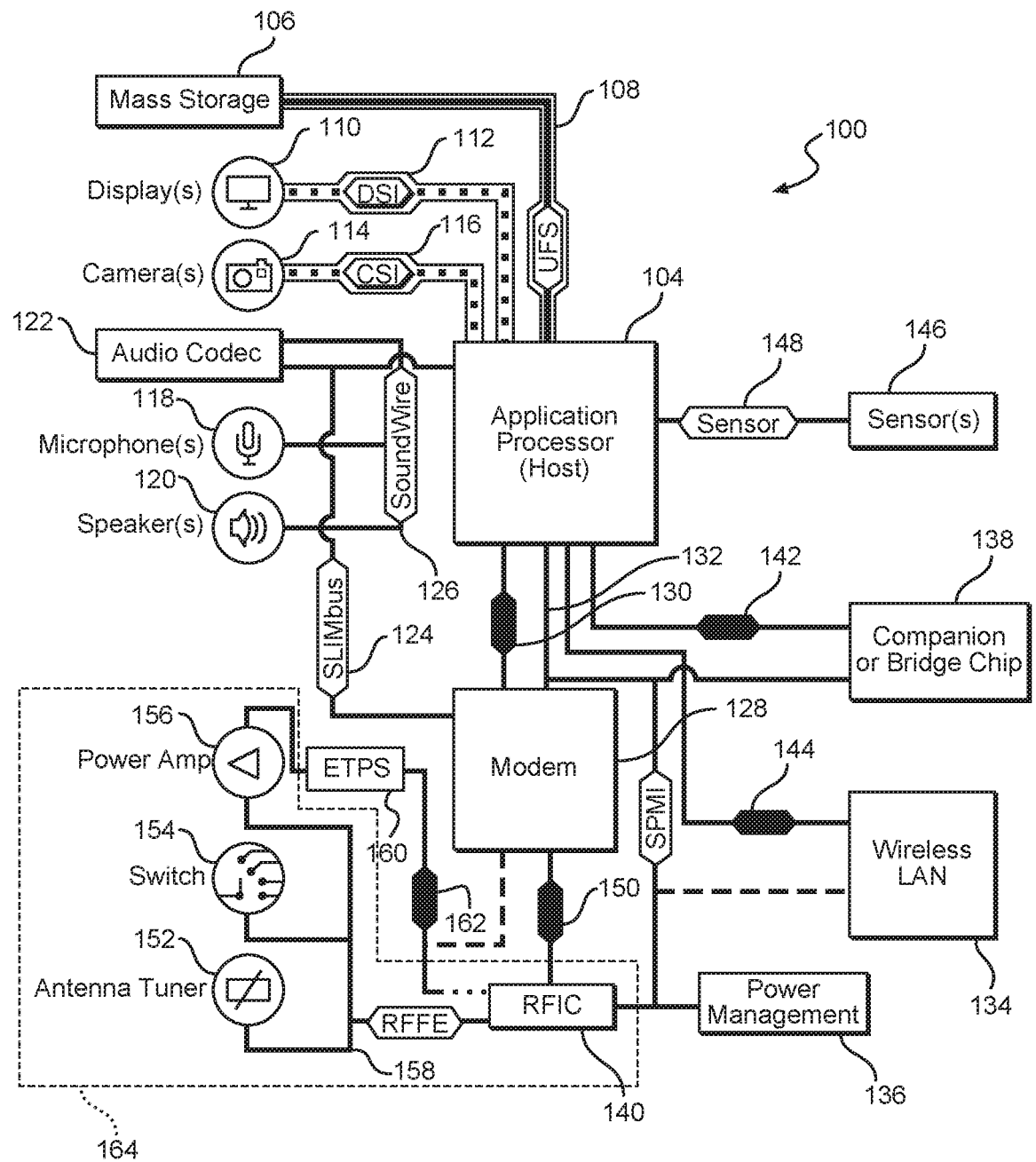
FIG. 1 is a block diagram of an exemplary mobile terminal including telephonic functions that generate audio streams handled according to an exemplary aspect of the present disclosure.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for providing audio streams over peripheral component interconnect (PCI) express (PCIE) links. In particular, exemplary aspects of the present disclosure are used to calculate an uplink timing requirement and adjust a margin time before a modem encodes audio data so that the encoding is done before data is transmitted to an external network. Further aspects of the present disclosure allow a first integrated circuit (IC) to synchronize its clock with that of the modem. By optimizing the PCIE link in this fashion, the audio stream is handled in such a manner so as to minimize discontinuities in the audio data and thus improve audio quality for the user. While telephonic functions are contemplated, other multimedia functions may also benefit from the present disclosure.

Before addressing particular aspects of the present disclosure, an overview of a mobile terminal having a PCIE link between a host and a device is provided to help explain the nature of audio signaling which may benefit from the present disclosure.

In this regard, FIG. 1 is a system-level block diagram of an exemplary mobile terminal 100 such as a smart phone, mobile computing device, tablet, or the like. The mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUND-WIRE bus 126. While SOUNDWIRE and SLIMbus are specifically contemplated, other audio buses may also be used such as an Inter-Integrated circuit Sound (I2S) bus. The modem 128 may further be connected to the application processor 104 through a PCIE link 130 and/or a system power management interface (SPMI) bus 132.

With continued reference to FIG. 1, the SPMI bus 132 may also be coupled to a local area network (LAN) IC, which could be a wireless LAN (e.g., WLAN IC) 134, a power management integrated circuit (PMIC) 136, a companion IC (sometimes referred to as a bridge chip) 138, and a radio frequency IC (RFIC) 140. It should be appreciated that separate PCI or PCIE links 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more radio frequency front end (RFFE) elements, such as an antenna tuner 152, a switch 154, and a power amplifier 156 through a radio frequency front end (RFFE) bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 may be formed from a clock line and a data line (not illustrated). The mobile terminal 100 uses the RFFE system 164 to communicate with an external network such as a cellular network. Likewise, the WLAN IC 134 may be used to communicate with an external network.

In practice, audio received by the microphone 118 is passed to the application processor 104 which includes audio processing circuitry (not shown explicitly) such as an audio digital signal processor (ADSP). The audio data is processed by the audio processing circuitry and then sent over the PCIE link 130 to the modem 128 or over the PCIE link 144 to the WLAN IC 134.

Figure 2:
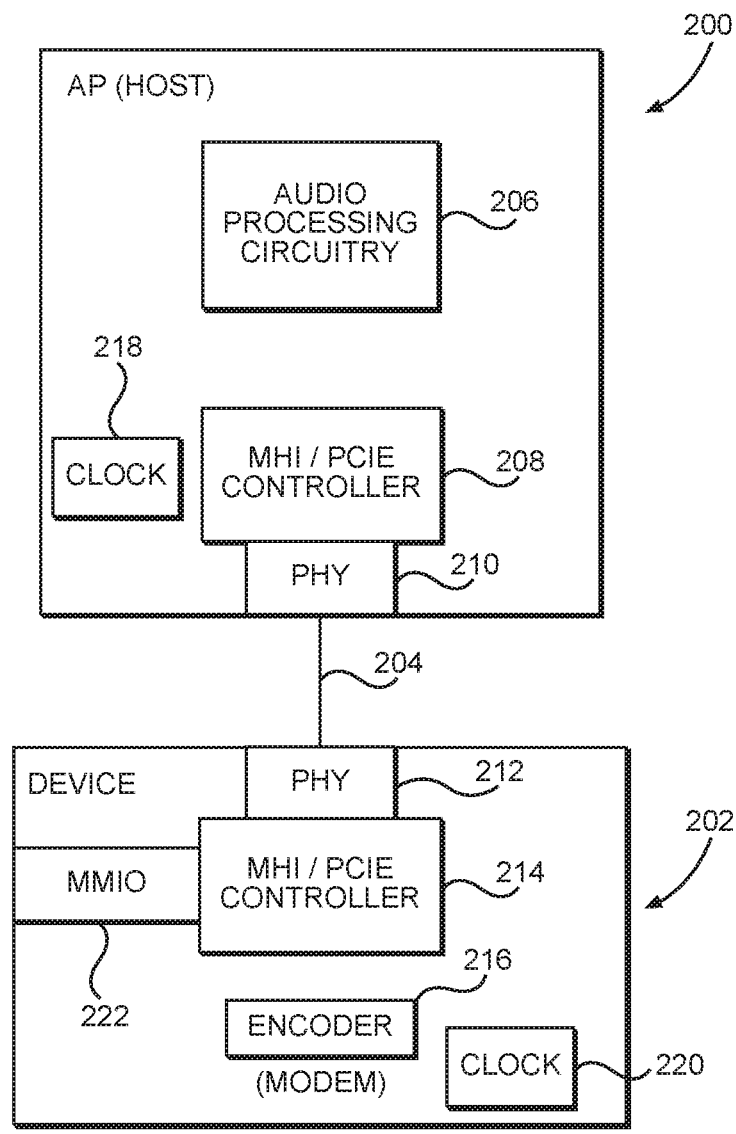
FIG. 2 is a simplified block diagram of a host and a device coupled by a communication bus.

FIG. 2 illustrates a simplified block diagram of a host 200 (which may be, for example, the application processor 104 of FIG. 1) communicating with a device 202 (which may be, for example, the modem 128) over a PCIE link 204. The host 200 includes audio processing circuitry 206 (and/or software components that operate on a low-power audio subsystem (LPASS) processor), which samples audio data such as data from the microphone 118 of FIG. 1, and transmits the sampled audio data to the device 202 through a modem host interface (MHI) 208. The MHI 208 may also be referred to as a PCIE controller which operates as the medium access control (MAC) layer in the sense that it takes the MHI protocol read/write requests and translates them to the PCIE transaction layer protocol (TLP), which uses a physical layer (PHY) 210 as a link or bus interface to send the data over the PCIE link 204. At the device 202, a device PHY 212 passes the data to a device MHI 214. The device 202 uses an encoder 216 to encode data before passing the encoded data to an external network. In most instances, the host 200 may have a host clock 218, and the device 202 may have a device clock 220. Alternatively, and not illustrated, the host 200 and the device 202 may receive a clock signal from a system clock (not shown). It should be appreciated that the clocks 218 and 220 may drift relative to one another. The host 200 may drift either slower or faster with respect to the time source of the device 202. Negative drift will cause an interruption in audio delivery as there may be missing audio samples. Positive drift will increase round trip delay. If the host 200 is drifting faster, the device 202 is encoding older and older data. Likewise, differing clock paths from the system clock may cause the respective clock signals to drift relative to one another. Exemplary aspects of the present disclosure provide techniques to correct these clock drifts to help provide improved audio quality.

The device 202 may further include a memory element and, specifically, a memory mapped input/output (MMIO) 222, which is a memory mapped input/output that is exposed to the host 200 through the PCIE link 204. The MMIO 222 may include a plurality of registers that the host 200 may write to and read from. While not explicitly illustrated, two such registers are a timesyncex (i.e., time synchronize execute) command register and a TMDMR (i.e., time modem received) register whose functions are explained in greater detail below with reference to FIG. 4. There may also be another register (not illustrated), namely a TMDM register, which is the modem time. This register may be read by the host 200. The TMDM register will return the current modem time when the read request is received as a completion TLP to the read request. Using the TMDM register in this fashion bypasses the hardware and event approach outlined in FIG. 4 and offers a more efficient time synchronization operation. However, any local offsets to the base system time cannot be applied in band. The offsets will then have to be exposed via the registers in the MMIO 222 or a message sent over the PCIE link 204 via the MHI 214 or some other protocol.

Note that an offset may be different than the drift. Exemplary aspects of the present disclosure address both an offset, which is the time difference between a host time and a device time, and drift. For example, at a single global time, the host may have a time x and the device may have a time y. In contrast, drift is the difference between an absolute x milliseconds (ms) at the host and an absolute y ms at the device. I.e., drift is x-y ms. For example, 100 ms at the host may equal 99 ms at the device (or 101 ms if drifting the opposite). Zero drift is possible, but unusual, and means that the host determination of what is 100 ms is precisely what the device determines is 100 ms.

Figure 3:
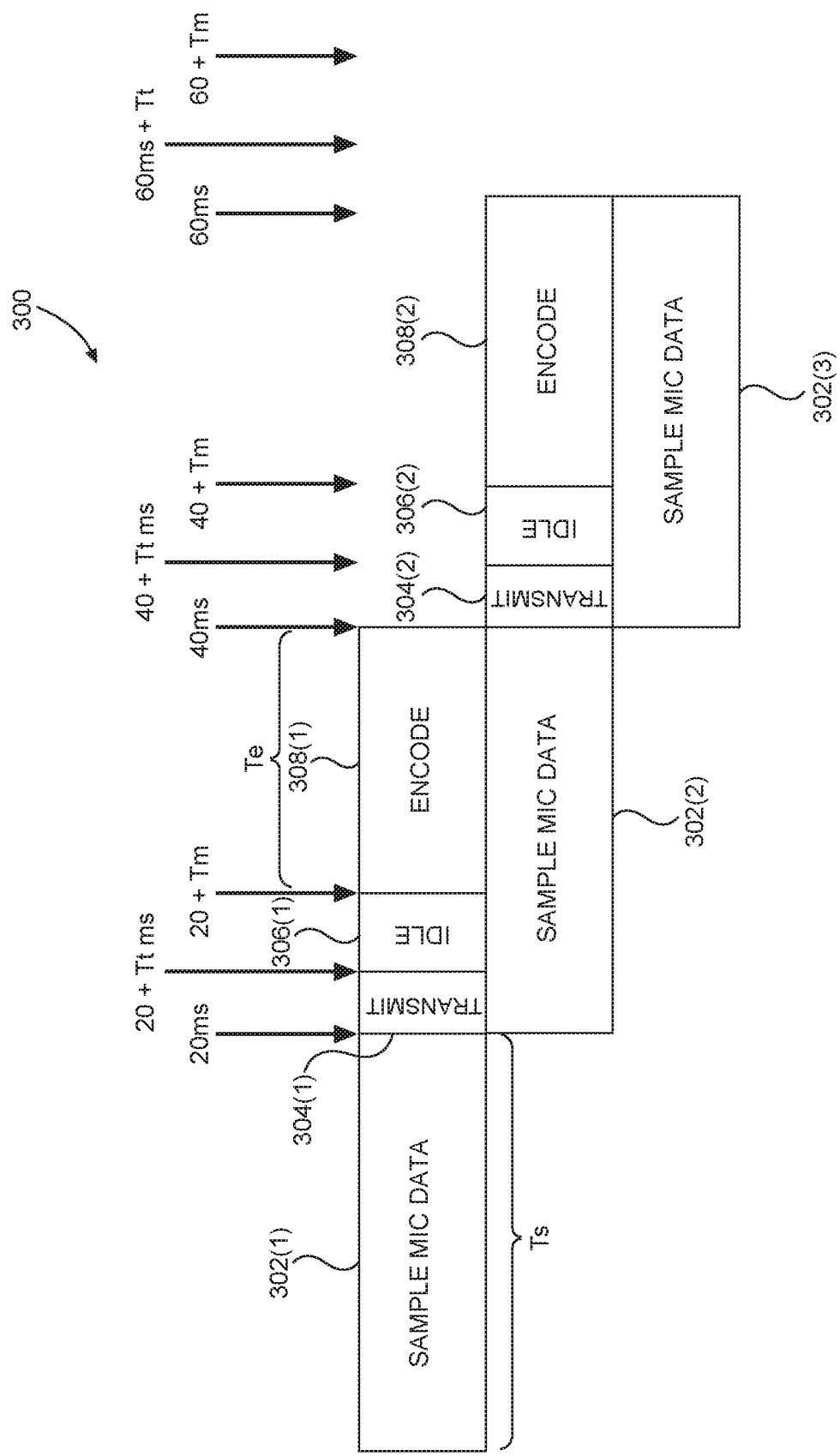
FIG. 3 is a signal flow diagram illustrating exemplary uplink timing requirements between a host and a modem for audio stream processing.

FIG. 3 provides a simplified signal flow 300 for the continuous activity associated with an audio stream according to an exemplary aspect of the present disclosure. The signal flow 300 begins with the host 200 of FIG. 2 sampling audio data (block 302(1)) for a predefined amount of time Ts (e.g., 20 milliseconds (ms)). The host 200 then transmits the sampled audio data to the device 202 (block 304(1)) for time Tt (e.g., typically less than 1 ms). While transmitting, the host 200 continues to sample the audio data (block 302(2)-302(3)). The device 202 is idle while receiving the transmitted audio data for a buffer or margin time Tm (block 306(1)). After the expiration of Tm, the device 202 encodes the sampled audio data (block 308(1)). The amount of time required to encode is labeled Te. Note that the goal is to make Tm+Te=Ts. In this fashion, subsequent sampling times align with the transmission and encoding. Thus, for example, sampling time block 302(3) is the same time as transmission block 304(2) plus idle block 306(2) and encoding block 308(2). Note that Tt should be less than Tm so that the encoding has sufficient time available to finish the encoding before the next transmission. Likewise, Tm<<Te so that the latency of the system is low enough that the user experience is not degraded. If Tm is increased, then more audio data is sampled in blocks 302(1)-302(3), which means that it takes longer for that data to be collected and sent to the end user (i.e., latency). If there is too much latency, then the end user may experience audio degradation. Note that Ts may be set during call set-up. Note that most cellular standards have precise time slots in which the modem may send data to the external network, and audio data must be delivered to the modem 128 at precise intervals such that the modem can encode at appropriate intervals to ensure that the audio data is available for the designated time slots. To ensure that the audio data is delivered to the modem 128 at the precise intervals, the host must ensure accurate timing of encoding intervals so that the audio data is delivered on time. To do this, the host must synchronize its internal clock to the internal clock of the modem to detect any drift between the two clocks.

Figure 4:
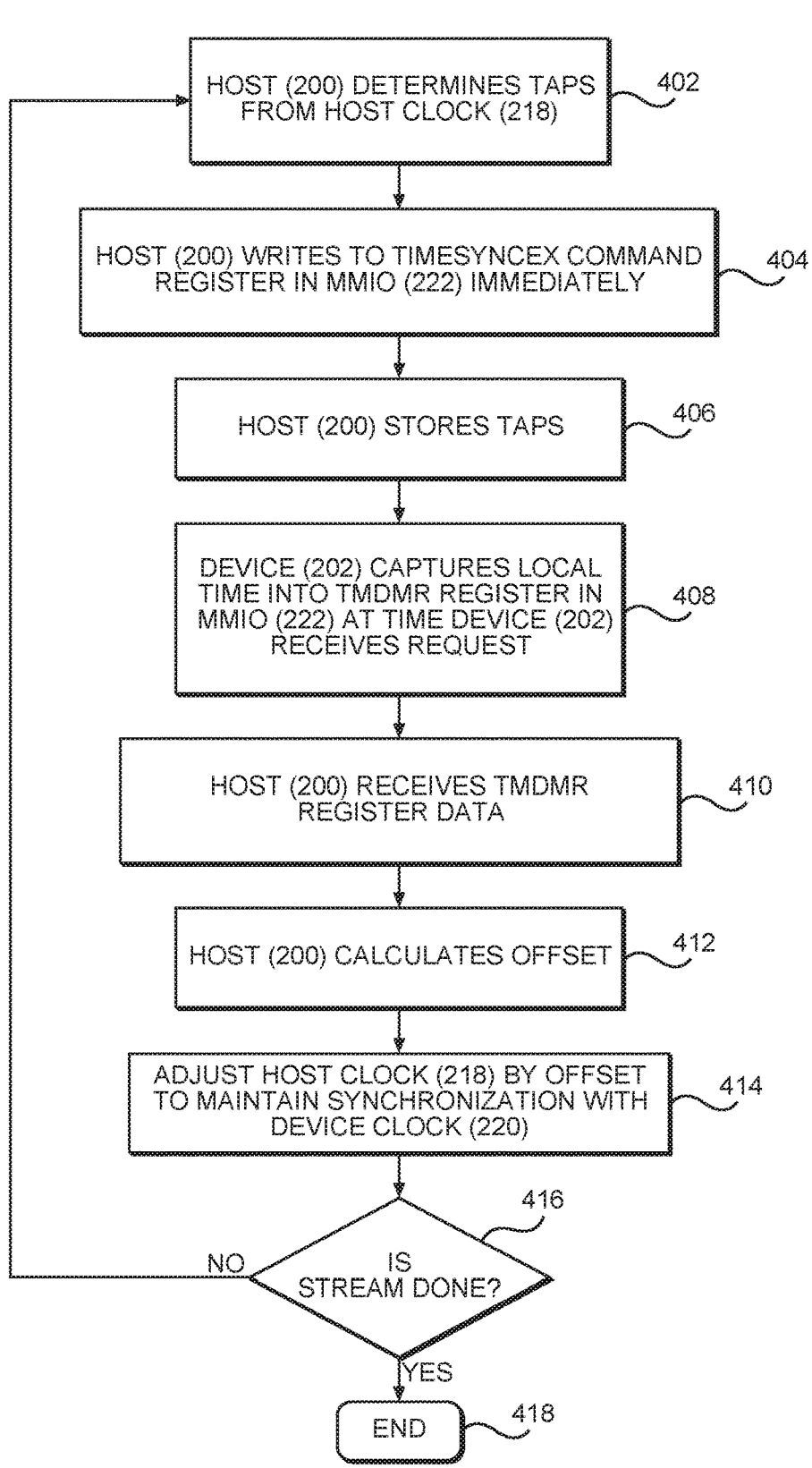
FIG. 4 is a flowchart illustrating an exemplary process for synchronizing timing between a host and a modem where the host acquires clock data from the device.

FIG. 4 is a flowchart illustrating an exemplary process 400 for synchronizing timing between the host 200 of FIG. 2 and the device 202 (modem). The process 400 begins with the host 200 determining a time TAPS from the host clock 218 (block 402). The host 200 writes to a timesyncex command register in the MMIO 222 immediately (block 404). Note that this posted command may include a time source identifier and a request number, which may be a monotonically increasing number to track the freshness of the write command. Concurrently the host 200 stores the TAPS in a local memory (block 406). The device 202 captures a local time based on the device clock 220 into a TMDMR register in the MMIO 222 at the time the device 202 receives the posted command of block 404 (block 408). In an exemplary aspect, the posted command effectively captures the local time and causes the hardware to latch the current time into registers. There may be an event ring associated with sending the data in the TMDMR register to the host 200. Subsequently, the host 200 receives the data in the TMDMR register (block 410). In a first exemplary aspect, the host 200 issues a read command to retrieve the data in the TMDMR register. In a second exemplary aspect, the device 202 pushes the data in the TMDMR register to the host 200, such as through an interrupt or other standard signaling technique. From the TAPS and the TMDMR register, the host 200 then calculates an offset (block 412). In theory, with no drift, there would be a single constant offset between the host 200 and the device 202 (unless a device changed time sources). However, because there may be relative drift between the time sources of the host 200 and the device 202, the process may iterate to capture and correct for drift. Thus, the cumulative offset is indicative of drift between the clocks. Alternatively, drift may be calculated separately as a difference in time at the host 200 for a predefined period versus a difference in time at the device 202 for the same predefined period. Extending an example above, the difference at the host 200 may be x2−x1 for the predefined period, and the difference at the device 202 may be y2−y1. Thus, the drift would be (x2−x1)−(y2−y1).

In particular, the offset Toffset=TAPS+Twrite−TMDMR where Twrite is the time it takes to execute the write command that writes to the timesyncex command register inclusive of any processing time. The accuracy of the offset calculation will depend on the accuracy or variance of Twrite. In an exemplary aspect, Twrite is measured in situ. This measurement may be done once or periodically as needed or desired. Alternatively, this may be simulated and the results of the simulation stored for use. The accuracy will also depend on a variance of time delta between the host obtaining the TAPS and the time it takes to write the TAPS into its local memory to trigger the MMIO write. If this time is non-deterministic, then there may be reduced accuracy. Note further that there may be jitter associated with this calculation which would affect its accuracy. If the L1 link state (including sub-states such as L1.1 and L1.2) is disabled during this transaction, then the jitter for the posted command should be negligible, and the only source of jitter during the write would come from the device. That is, any link power management yields increased jitter since the time to recover the link back to L0 is non-deterministic and can vary. Therefore, to ensure lower latency in the process 400, L1 low-power states are disabled. Assuming the host has priority execution and pre-emption is disabled at the device (e.g., with a spin lock or the like), the jitter between reading time and writing to the TMDMR register is +/−TMDMjitter. Thus, the overall accuracy should be +/−(TMDMjitter+TAPjitter).

Once the offset is determined in block 412, the host clock 218 may be adjusted by the offset to keep the host clock 218 synchronized with the device clock 220 (block 414). The host 200 then determines if the stream is done (block 416). If not, the process 400 repeats. If yes, the process 400 ends. Note that there may be iterative offset calculations to average out variations.

Note that the event-based approach of process 400 allows multiple events to be transmitted into a circular buffer which allows the host 200 to receive multiple TMDMRs from multiple timesyncrequests in the same place. The interrupt (MSI) is an indication that a new event is generated.

While the event-based approach of process 400 is one way to transfer clock data, there may be other ways and other uses for these registers. For example, the base modem system time TMDMR may be amended by a local offset within the modem. In some cases multiple time sources exist in the computing device such as a local system time (reflected by TMDMR) and network time, which is set by an external network (e.g., a cellular network). When a handoff occurs or the computing device switches to another network, the network time may change. Aspects of the present disclosure are capable of adjusting to such changes.

Another approach is to send the TMDMR data to a predefined host location. The device can simply update the address in the host where the TMDMR should be delivered. In this approach, there is no option to support multiple events and any subsequent timesync command would cause the loss of the previously communicated TMDMR to be lost.

Another approach is for the host 200 to poll on either the TMDMR register or to poll on its event ring at a later time (no MSI needs to be sent), in which case the host 200 can process the timesync data as needed or desired.

Figure 5:
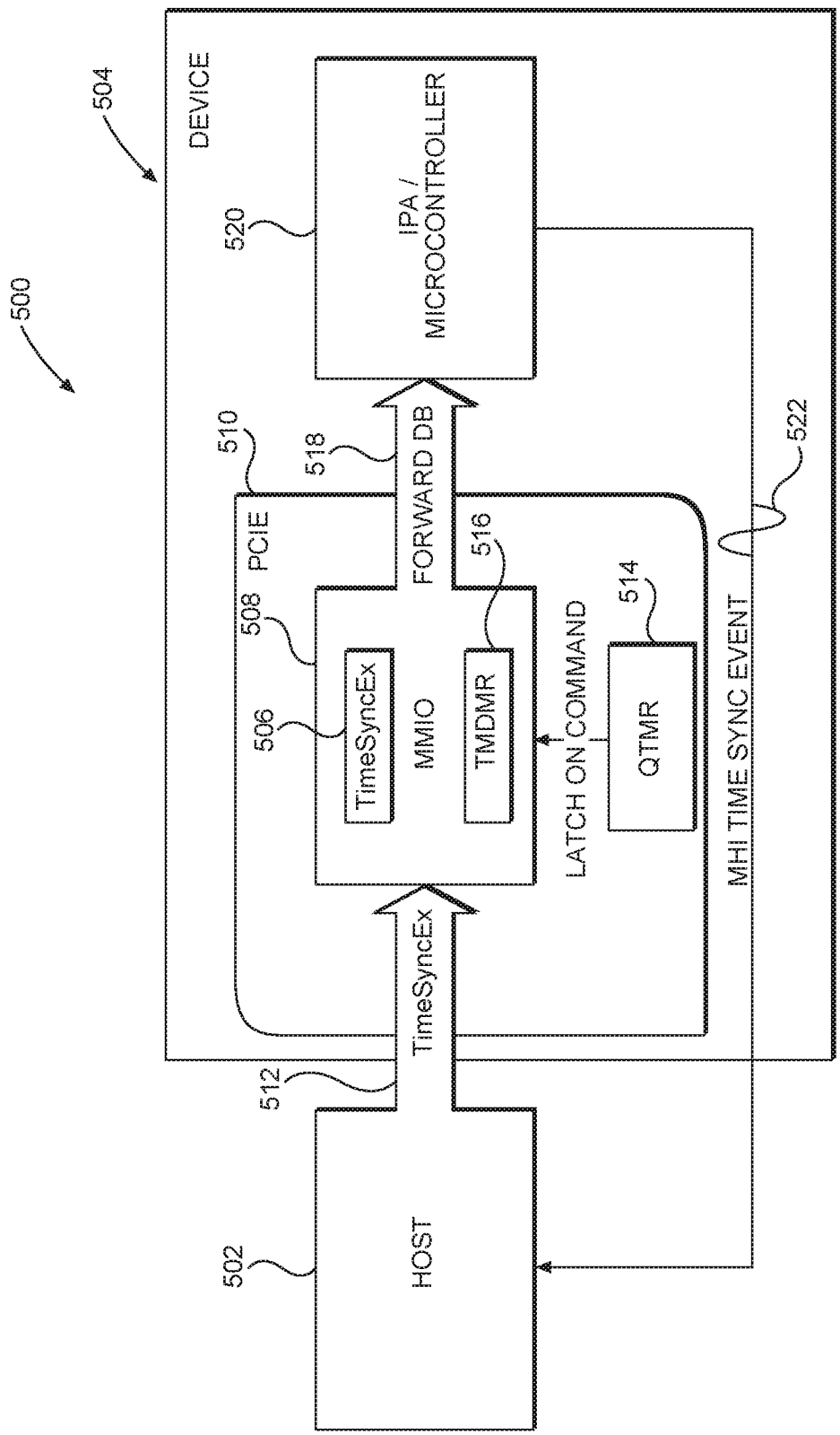
FIG. 5 is a simplified block diagram showing additional elements within a device and how they implement exemplary aspects of the present disclosure.

FIG. 5 is a simplified block diagram of a computing system 500 illustrating a time capture process by which a host 502 can acquire time data from a device 504 for an offset calculation. In particular, the host 502 writes to a timesyncex register 506 in a MMIO 508, which is in a PCIE controller 510 (as noted above, this may also be referred to as an MHI). The host 502 uses a PCIE link 512 to write to the timesyncex register 506. On receipt of a capture command, the PCIE controller 510 caches the current clock value (QTMR) 514 into a TMDMR register 516 and forwards a doorbell command (DB) 518 to an internet protocol (IP) accelerator (IPA) 520. Note that the QTMR 514 may be generated locally, which minimizes latency, or generated elsewhere in the computing system 500 and accessible to the device 504 through a clock bus (not illustrated). Note that such a remote clock source introduces additional latency. The IPA 520 serves as a digital signal processor (DSP) or micro-controller that is able to perform various MHI-related processing, such as IP packet channel management, IP header processing, IP filtering, and the like. In this situation, the IPA 520 also builds an MHI time sync event 522 and sends it back to the host 502 to inform the host 502 of the value in the TMDMR register 516. As explained above, the host 502 may then calculate drift. The IPA 520 may be a high-power processor core or a custom low-power core. In still another aspect, the IPA 520 may be a DSP.

Figure 6:
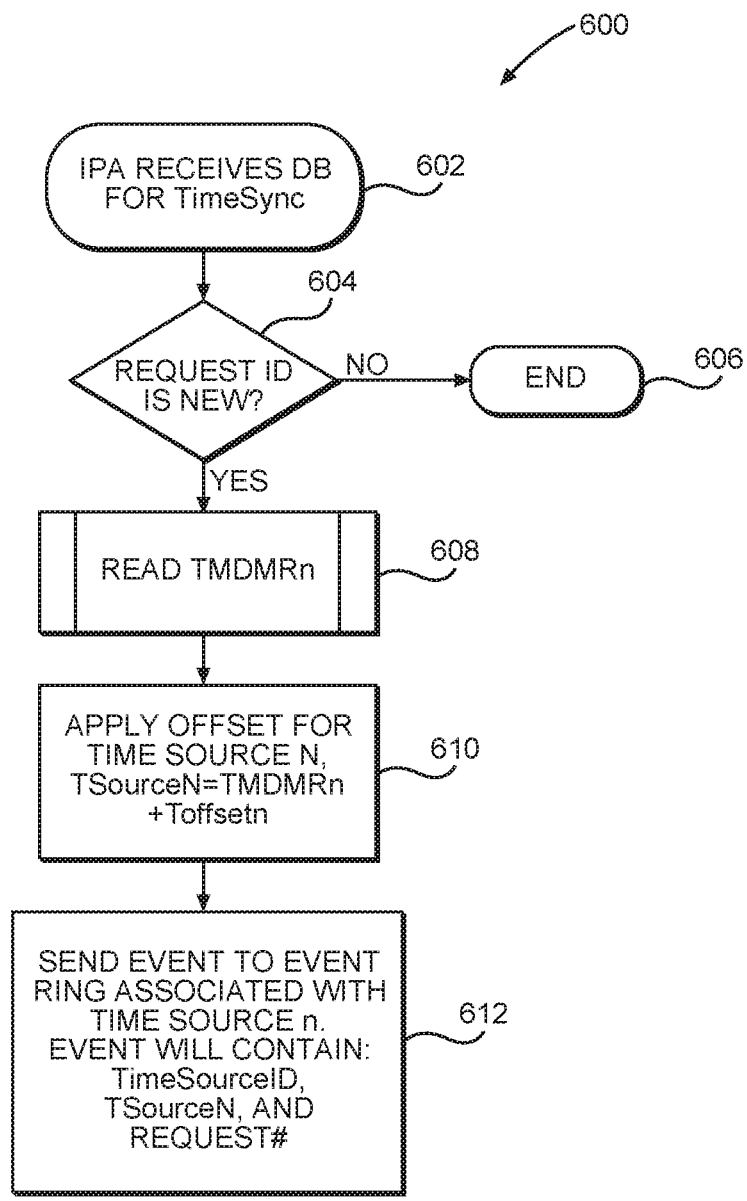
FIG. 6 is a flowchart illustrating an exemplary process for handling a posted command at a device.

FIG. 6 is a flowchart illustrating a process 600 showing how the capture command is processed by the IPA 520 of FIG. 5. In particular, the process 600 begins when the IPA 520 receives the DB 518 for the timesync (block 602). The IPA 520 determines if the request is new (block 604). If the answer is no, then the process ends (block 606). If the answer to block 604 is yes, the request is new, then the IPA 520 reads the TMDMR register 516 (block 608). Depending on the time source, the device applies an offset for time source N TsourceN, where TsourceN=TMDMRn+Toffset (block 610). For example, system time may be different than network time and have different offsets. The device sends the event to an event ring associated with the time source N containing a time source ID, a TMDMR, and a request number (block 612). The request number may also be referred to as a request identifier.

Figure 7:
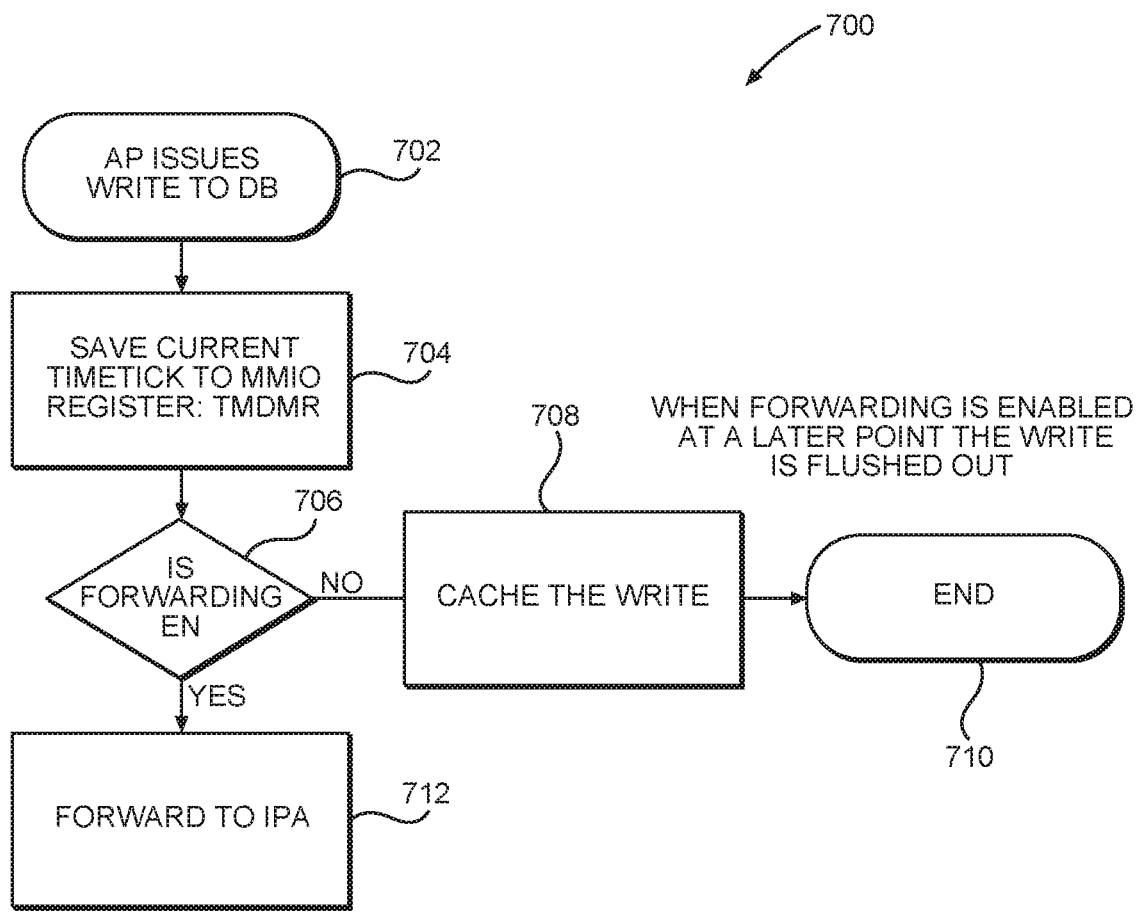
FIG. 7 is a flowchart illustrating an exemplary process for a controller handling a posted command at a device.

FIG. 7 shows a process 700 for how the PCIE controller 510 of FIG. 5 handles the posted command. In particular, the host 502 issues the posted command to the device 504 (block 702). The PCIE controller 510 saves the current time to the MMIO register: TMDMR (block 704). Optionally, this may be forwarded to other elements and the PCIE controller 510 determines if it is a forwarding event (block 706). If the answer is no, then the posted command is cached (block 708) and the process 700 is ended (block 710). Otherwise, if the answer is yes, then the DB 518 is forwarded to the IPA 520 (block 712). Note that the forwarding event may be disabled when the microcontroller (e.g., IPA 520) is not available or powered off. When the microcontroller is later powered on, the cached commands are provided to the microcontroller.

Figure 8:
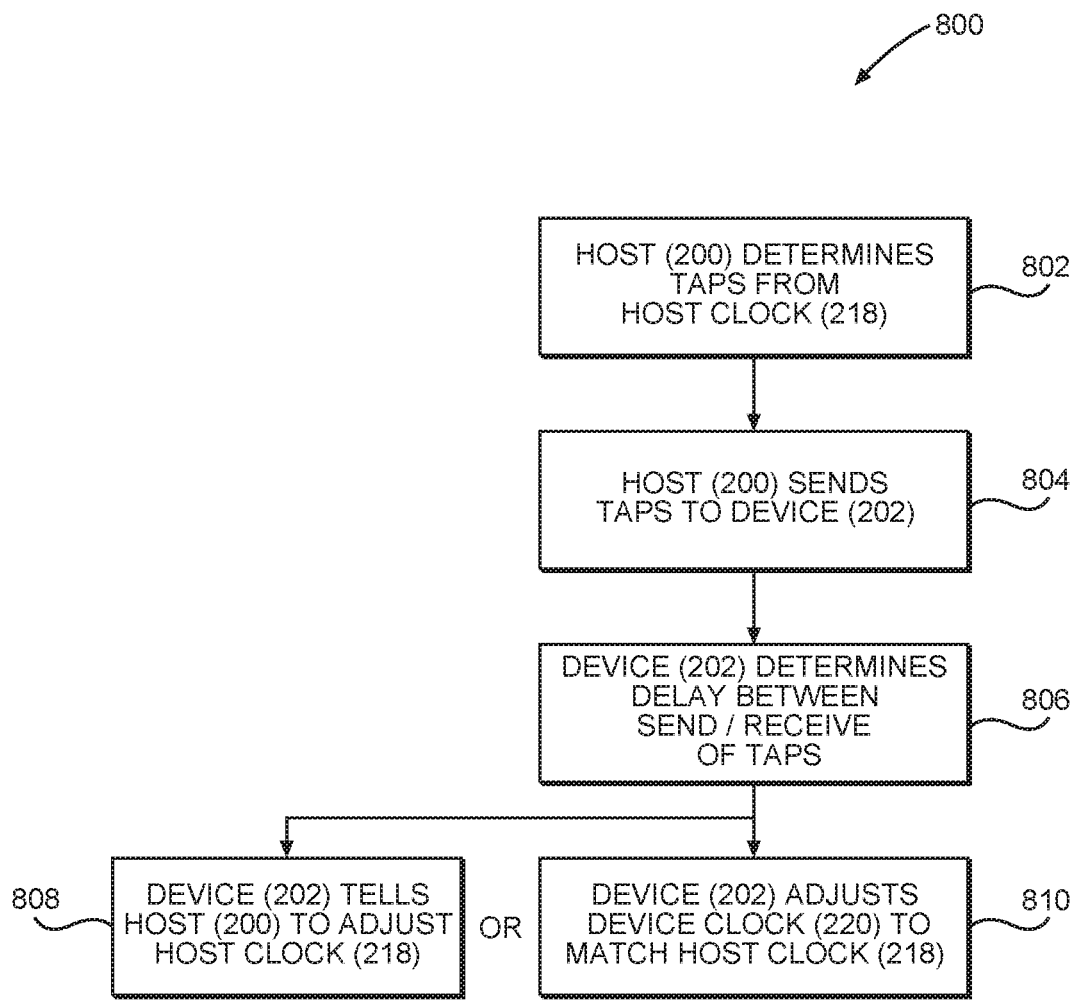
FIG. 8 is a flowchart illustrating an exemplary process for synchronizing timing between a host and a modem where the modem modifies its clock based on the host clock.

FIG. 8 illustrates an alternate aspect where the device 202 of FIG. 2 handles the offset calculation and the clock adjustment. In this regard, a process 800 begins with the host 200 determining a TAPS from the host clock 218 (block 802). The host 200 then sends the TAPS to the device 202 (block 804). The device 202 determines the delay between the sending and the receiving of the TAPS (block 806). Note that the calculation may be done by receiving round trip delay information from the host 200 and using that to compare the TAPS to the TMDMR or by the device 202 calculating the round trip delay and determining the delay between the TAPS and the TMDMR. Based on this determining, the device 202 may tell the host 200 to adjust the host clock 218 (block 808), or the device 202 may adjust the device clock 220 (block 810).

The system and methods for providing audio streams over PCIE links according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a DSP, an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. A method for synchronizing clocks across a point-to-point serial bus interface, the method comprising:
   determining a time offset between a host clock and a device clock in part by acquiring a command receipt time from a device associated with the device clock and storing an initial time at a host associated with the host clock; and
   adjusting the host clock by the time offset when sending audio data to the device.

2. The method of claim 1, wherein the point-to-point serial bus interface comprises a peripheral component interconnect (PCI) express (PCIE) bus interface.

3. The method of claim 1, wherein the host that includes the host clock comprises an application processor.

4. The method of claim 1, wherein the device comprises a modem.

5. The method of claim 1, wherein determining the time offset further comprises sending a command to the device.

6. The method of claim 5, wherein acquiring the command receipt time from the device further comprises acquiring a write command receipt time from the device.

7. The method of claim 6, wherein acquiring the write command receipt time comprises reading a register in the device.

8. The method of claim 6, wherein acquiring the write command receipt time comprises receiving the write command receipt time pushed from the device.

9. The method of claim 5, wherein determining the time offset further comprises considering jitter.

10. A method of maintaining synchronization between a modem and an application processor over a peripheral component interconnect (PCI) express (PCIE) link, the method comprising:
    receiving a posted command at a device over a point-to-point serial bus interface;
    storing a request identifier and a time source in a first register within a memory mapped input/output (MMIO) at the device;
    responsive to receiving the posted command, storing a local time in a second register within the MIMO at the device; and
    providing the local time to a host.

11. The method of claim 10, wherein providing the local time to the host comprises providing the local time responsive to a read command from the host.

12. The method of claim 10, wherein providing the local time to the host comprises pushing the local time to the host.

13. An apparatus comprising an application processor comprising:
    a point-to-point serial bus interface;
    a host clock; and a modem host interface operatively coupled to the point-to-point serial bus interface and the host clock and configured to:
 determine a time offset between the host clock and a clock at a device in part by acquiring a command receipt time from a device associated with the device clock and storing an initial time; and
 adjust the host clock to maintain synchronization between the host clock and the clock at the device.

14. The apparatus of claim 13, wherein the point-to-point serial bus interface comprises a peripheral component interconnect (PCI) express (PCIE) bus interface.

15. The apparatus of claim 13, further comprising a register configured to store the initial time associated with the host clock.

16. The apparatus of claim 13, wherein the modem host interface is further configured to send a write command to the device.

17. The apparatus of claim 16, wherein the command receipt time comprises a write command receipt time associated with the write command from the device.

18. The apparatus of claim 13, further comprising an integrated circuit (IC).

19. The apparatus of claim 13, further comprising a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter, wherein the application processor is integrated into the device.

20. An apparatus comprising a first device comprising:
a point-to-point serial bus interface;
a memory mapped input/output (MMIO) comprising:
 a first register; and
 a second register; and
a modem host interface operatively coupled to the point-to-point serial bus interface and configured to:
 receive a posted command from a host;
 store a request identifier and a time source in the first register;
 responsive to receiving the posted command, store a local time in the second register; and
 provide the local time to the host.

21. The apparatus of claim 20, wherein the modem host interface is configured to provide the local time to the host responsive to a read command from the host.

22. The apparatus of claim 20, wherein the modem host interface is configured to push the local time to the host.

23. The apparatus of claim 20, further comprising an integrated circuit (IC).

24. The apparatus of claim 20, further comprising a second device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter, wherein the first device is integrated into the second device.

* * * * *